United States Patent [19]

Sakuma et al.

[11] Patent Number: 5,147,931

[45] Date of Patent: Sep. 15, 1992

[54] THERMOPLASTIC RESIN COMPOSITION

[75] Inventors: Masato Sakuma; Yuji Fujita; Kissho Kitano; Yukihiko Yagi; Masao Sakaizawa, all of Saitama; Noburo Yamamoto, Tokyo, all of Japan

[73] Assignee: Tonen Sekiyukageku, K.K., Tokyo, Japan

[21] Appl. No.: 715,872

[22] Filed: Jun. 14, 1991

Related U.S. Application Data

[63] Continuation of Ser. No. 455,039, Dec. 22, 1989, abandoned, which is a continuation of Ser. No. 283,164, Dec. 9, 1988, abandoned, which is a continuation of Ser. No. 143,555, filed as PCT JP87/00248/Apr. 17, 1987, abandoned.

[30] Foreign Application Priority Data

Apr. 14, 1986 [JP]  Japan .................................. 61-84264

[51] Int. Cl.$^5$ .............................................. C08L 77/00
[52] U.S. Cl. ...................................... 525/66; 525/179
[58] Field of Search ............................... 525/66, 179

[56] References Cited

U.S. PATENT DOCUMENTS

| | | | |
|---|---|---|---|
| 4,174,358 | 11/1979 | Epstein | 525/183 |
| 4,404,325 | 9/1983 | Mason et al. | 525/179 |
| 4,436,872 | 3/1984 | Flood et al. | 525/179 |

FOREIGN PATENT DOCUMENTS

| | | | |
|---|---|---|---|
| 008246 | 1/1982 | Japan . | |
| 074143 | 4/1984 | Japan . | |
| 0053550 | 3/1985 | Japan . | |
| 0076548 | 5/1985 | Japan . | |
| 0110740 | 6/1985 | Japan . | |
| 0028539 | 2/1986 | Japan . | |
| 2158739 | 7/1987 | Japan | 525/179 |

*Primary Examiner*—Ana L. Carrillo
*Attorney, Agent, or Firm*—W. G. Muller; J. E. Schneider

[57]  ABSTRACT

A thermoplastic resin composition which comprises 1 to 98 parts by weight of polyolefin (A), 1 to 49 parts by weight of modified polyolefin (B) obtained by reacting a polyolefin with an unsaturated carboxylic acid or a derivative thereof, 1 to 98 parts by weight of polyamide (C) [provided that (A)+(B)+(C)=100 parts by weight], 5 to 50 parts by weight of modified ethylene-α-olefin copolymer (D) obtained by reacting a low-crystalline ethylene-α-olefin copolymer with an unsaturated carboxylic acid or its derivative, and a metal compound (E) in an amount of 0.5 to 5 times the molar quantity of the acid added to said component (B) and said component (D).

The thermoplastic resin composition is preferably used for producing products excellent in both impact resistance and surface luster.

12 Claims, No Drawings

THERMOPLASTIC RESIN COMPOSITION

This is a continuation of application Ser. No. 455,039, filed Dec. 22, 1989, now abandoned, which is a continuation of U.S. Ser. No. 283,164 filed Dec. 9, 1988, now abandoned, which is based on Japanese 84,264/86 filed Apr. 14, 1986 (PCT/JP87/000233 filed Apr. 14, 1987); which is also Rule 60 continuation of U.S. Ser. No. 143,555 filed Feb. 1, 1988, now abandoned.

TECHNICAL FIELD

This invention relates to a thermoplastic resin composition used for producing products excellent in both impact resistance and surface luster.

BACKGROUND ART

Attempts to blend polypropylene and polyamide have been made to obtain a resin material having the water resistance of polypropylene, especially crystalline polyolefins, and the mechanical properties, heat resistance, and dyeability of polyamide. This object is not achieved by a mere blending of polypropylene and polyamide by melt-mixing. Mere blending provides a mixture which is subject to phase separation and is poor in surface gloss and mechanical properties, because polypropylene and polyamide mix poorly. To overcome this disadvantage, a blend of polypropylene and polyamide is incorporated with maleic anhydride-modified polypropylene.

The addition of the modified polypropylene alone is not sufficient to improve physical properties such as impact resistance and surface properties. therefore, there was proposed the incorporation of a low crystalline or amorphous polymer modified with an unsaturated carboxylic acid anhydride. For example, there is disclosed a composition composed of a polyamide and a modified product of a mixture of crystalline polyolefin and low-crystalline or amorphous ethylene-α-olefin copolymer (Japanese Patent Laid-open No. 8246/1982); a compound composed of a modified polypropylene, a polyamide, a modified product of low-crystalline or amorphous ethylene-α-olefin copolymer, and an inorganic filler (Japanese Patent Laid-open No. 53550/1985); a composition composed of polypropylene, polyamide and/or polyester, a modified product of low-crystalline or amorphous ethylene-α-olefin copolymer, and an inorganic filler (Japanese Patent Laid-open No. 76548/1985); and a composition composed of polypropylene, polyamide, and low-crystalline or amorphous modified propylene-α-olefin copolymer (Japanese Patent Laid-open No. 110740/1985).

On the other hand, for the improvement of dispersibility of polyamide into polyolefin and for the improvement of dyeability of polyolefin, there is proposed a composition composed of acid-modified polypropylene with a metal atom bond, polyamide, and polyolefin (Japanese Patent Laid-open No. 74143/1984).

Conventional compositions are improved in impact resistance by incorporating a low-crystalline or amorphous copolymer or an acid-modified product thereof. However, they have no satisfactory surface gloss. Compositions incorporated with acid-modified polypropylene with a metal atom bond are improved in dispersibility but not satisfactorily improved in impact resistance.

DISCLOSURE OF THE INVENTION

To eliminate the drawbacks involved in the conventional compositions and to obtain a new composition having improved compatibility, mechanical properties (especially impact resistance), and surface gloss, the inventors carried out research, and found that the above object is achieved by a composition composed of polyolefin, polyamide, modified polyolefin, low-crystalline modified ethylene-α-olefin copolymer, and a metal compound. This invention is based on the findings of the research.

Accordingly, the gist of the invention is a thermoplastic resin composition which comprises 1 to 98 parts by weight of polyolefin (A), 1 to 49 parts by weight of modified polyolefin (B) obtained by reacting a polyolefin with an unsaturated carboxylic acid or a derivative thereof, 1 to 98 parts by weight of polyamide (C) [provided that (A)+(B)+(C)=100 parts by weight], 5 to 50 parts by weight of modified ethylene-α-olefin copolymer (D) obtained by reacting a low-crystalline ethylene-α-olefin copolymer with an unsaturated carboxylic acid or a derivative thereof, and a metal compound (E) in an amount 0.5 to 5 times the molar quantity of the acid added to said component (B) and said component (D).

The polyolefin in the present invention is a homopolymer of ethylene or propylene, a homopolymer of α-olefin such as butene-1, pentene-1, hexene-1, and 4-methylpentene-1, a copolymer of ethylene and α-olefin, or a copolymer of two or more of these α-olefins. It is a crystalline polymer. The copolymer includes random copolymers and block copolymers. These polymers may be combined. Among the above-mentioned polyolefins, polypropylene and propylene-based polymers (such as propoylene-α-olefin random or block copolymers) are preferable from the standpoint of heat resistance and stiffness.

The modified polyolefin (B) in this invention is one which is formed by grafting the above-mentioned polyolefin with an unsaturated carboxylic acid or a derivative thereof in an amount of 0.001-10 wt %, preferably 0.05-5 wt %. Examples of the unsaturated carboxylic acid and its derivative include acrylic acid, maleic acid, fumaric acid, tetrahydrophthalic acid, itaconic acid, citraconic acid, crotonic acid, isocrotonic acid, endobicyclo[2.2.1]-5-heptene-2,3-dicarboxylic acid, acid anhydrides thereof, and esters thereof.

The grafting of a polyolefin with an unsaturated carboxylic acid or a derivative thereof may be accomplished by any known method. According to a preferred method, a polyolefin is melt-mixed with an unsaturated carboxylic acid or a derivative thereof and an organic peroxide such as di-t-butyl peroxide and 2,5-dimethyl-2,5-di-(t-butylperoxy)-hexyne-3 as a reaction initiator. According to another preferred method, a polyolefin is dissolved in a solvent, and an unsaturated carboxylic acid, or its derivative, and a reactioin initiator, are added to the solution for reaction.

The polyamide (C) in this invention is a polymeric compound having the acid amide (—CONH—) as the repeating unit. It is classified, according to the type of polymerization, into (1) one which is formed by a ring-opening polymerization of lactam, (2) one which is formed by polycondensation of aminocarboxylic acid, and (3) one which is formed by polycondensation of diamine and dibasic acid. They are called nylon by the generic name, and they include nylon-6, nylon-12, nylon-9, nylon-11, nylon-66, and nylon-610. Among them are preferably nylon-6 and nylon-66. The polyamide is not specifically limited in molecular weight; but the preferred molecular weight is one which corresponds to a relative viscosity ($\eta_{rel}$) higher than 0.5, preferably higher than 2.0.

The low-crystalline ethylene-α-olefin copolymer used in this invention include copolymers of ethylene with an α-olefin such as propylene, butene-1, pentene-1, hexene-1, and 4-methylpentene-1, and copolymers of ethylene, α-olefin, and nonconjugated diene. Preferred copolymers are low-crystalline or amorphous ones which contain 20–80 wt % of ethylene and have a Mooney viscosity $ML_{1+8}$ (127° C.) of 5–300 and a degree of crystallinity lower than 40% (measured by X-ray diffractometry). Preferred examples include rubber substances such as ethylene-propylene copolymer, ethylene-butene-1 copolymer, propylene-butene-1 copolymer, and ethylene-propylene-diene copolymer.

The modified ethylene-α-olefin copolymer (D) in this invention is one which is obtained by reacting the above-mentioned low-crystalline or amorphous ethylene-α-olefin copolymer with the above-mentioned unsaturated carboxylic acid, or its derivative, in an amount of 0.001–10 wt %, preferably 0.05–5 wt %.

This modified ethylene-α-olefin copolymer may be produced in the same manner as used for the modification of the above-mentioned crystalline polyolefin. Usually, a low crystalline or amorphous ethylene-α-olefin copolymer is incorporated with an unsaturated carboxylic acid anhydride and an organic peroxide, and the mixture is melt-mixed using an extruder, Banbury mixer, or the like.

The metal compound (E) in this invention is a hydroxide, carboxylate, or oxide of a metal belonging to Groups I, II, and III of the Periodic Table. Examples of such a metal include lithium, sodium, potassium, cesium, magnesium, barium, zinc, and aluminum. Preferable among them are sodium and zinc compounds.

The composition of this invention is composed of the following components:
  Polyolefin (A): 1–98 parts by weight, preferably 10–90 parts by weight.
  Modified polyolefin (B): 1–49 parts by weight, preferably 5–40 parts by weight.
  Polyamide (C): 1–98 parts by weight, preferably 10–90 parts by weight. (Provided that (A)+(B)+(C)=100 parts by weight)
  Modified ethylene-α-olefin copolymer (D): 5–50 parts by weight, preferably 1–40 parts by weight.
  Metal compound (E): 0.5–5 times, preferably equal to the molar quantity of the acid added to said components (B) and (D).

With polyolefin (A) less than 1 part by weight, the resulting composition is not improved in moisture resistance and chemical resistance by the polyolefin. Conversely, with polyolefin (A) in excess of 98 part by weight, the resulting composition is not improved in mechanical properties, heat resistance, and barrier properties by polyamide (C). With modified polyolefin (B) less than 1 part by weight, the resulting composition is not improved in compatibility by the bonding with the metal compound. Conversely, with modified polyolefin (B) in excess of 49 parts by weight, the resulting composition is poor in physical properties and melt-flowability due to a excessive crosslinking reaction. With the modified ethylene-α-olefin copolymer less than 5 parts by weight, the resulting composition is not improved in impact resistance, and with more than 50 parts by weight, the resulting composition greatly decreases in mechanical properties, heat resistance, and surface hardness. With metal compound (E) less than 0.5 times in mol, the resulting composition is not improved in compatibility by the bonding to the acid attached to components (B) and (D).

Conversely, with a metal compound (E) in excess of 5 times in molar quantity, the resulting composition has no effect by the reaction with the acid attached. An excess metal compound (E) is also uneconomical.

The composition of the invention may be prepared by mixing the above-mentioned polyolefin (A), modified polyolefin (B), polyamide (C), modified ethylene-α-olefin copolymer (D), and metal compound (E) according to the above-mentioned formulation, and subsequently melt-mixing the mixture. For example, the above-mentioned components are previously dry-blended by using a Henschel mixer, ribbon blender, or the like, and then the resulting mixture is mixed in a Banbury mixer, roll mill, extruder, or the like at a temperature at which the resins melt. After melt-mixing the composition is palletized or crushed.

The incorporation of the metal compound (E) may be accomplished by any one of the following methods:

(1) A previously modified polyolefin (B) and a metal compound (E) are melt-mixed to give an acid-modified polyolefin to which metal atoms are bonded. This composition is melt-mixed with a polyolefin (A), polyamide (C), and a modified ethylene-α-olefin copolymer (D). (Sequential mixing method)

(2) A polyolefin (A), a modified polyolefin (B), a polyamide (C), a modified ethylene-α-olefin copolymer (D), and a metal compound (E), are mixed by melt-mixing all together. (Simultaneous mixing method)

(3) A polyolefin (A), a modified polyolefin (B), a polyamide (C), and a modified ethylene-α-olefin copolymer (D), are previously melt-mixed, and then a metal compound (E) is added, and the mixture is melt-mixed. (After mixing method)

The simultaneous mixing method and sequential mixing method are preferable from the standpoint of improvement in tensile strength and surface gloss.

The composition of the invention may be incorporated with a heat stabilizer, UV light absorber, nucleating agent, antistatic agent, slip agent, flame retardant, coloring agent, inorganic filler, plasticizer, and the like, in amounts not detrimental to the object of the invention.

During melt-mixing, the acid-modified product in the composition forms the network structure through ionic crosslinking by the neutralization with the metal in the metal compound. The network structure embraces the polyolefin and polyamide, thereby improving their miscibility and the surface gloss of the composition. This structure in combination with the modified ethylene-α-olefin copolymer improves mechanical strength such as impact resistance. Especially where the metal compound is added together with or separately from other components, the resulting composition is improved in surface gloss and impact resistance over a compound which is formed in such a manner that the metal compound is melt-mixed with the acid-modified product and the resulting mixture is again melt-mixed with other components. This is because the former composition has a more uniform network structure.

THE BEST MODES FOR CARRYING OUT THE INVENTION

Examples

The invention is now described in more detail by reference to the following examples, in which parts and percent are based on weight.

Materials used

Preparation of Modified polypropylene (1) 100 parts of crystalline propylene-ethylene block copolymer (MFR=1.0 g/10 min, ethylene content=7.0%), 1.0 part of endobicyclo-[2.2.1]-5-heptene-2,3-dicarboxylic anhydride (referred to as HA acid hereinafter), and 0.3 parts of 2,5-dimethyl-2,5-di-(t-butylperoxy)-hexyne-3 as a reaction initiator, were dry-blended. The resulting mixture was fed to a vented single-screw extruder, with the cylinder temperature set at 225° C., for melt-mixing. Thus a modified propylene-ethylene block copolymer (referred to as modified PP-1 hereinafter) was obtained. The amount of the acid added was 0.4%.

(2) A modified homopolypropylene (referred to as modified PP-2 hereinafter) was prepared in the same manner as for modified PP-1 except that the block copolymer was replaced by crystalline homopolypropylene (MFR=1.0 g/10 min). The amount of the acid added was 0.3%.

(3) A modified propylene-ethylene block copolymer (referred to as modified PP-3 hereinafter) was prepared in the same manner as for modified PP-1 except that maleic anhydride (referred to as MA acid hereinafter) was used as the acid modifier. The amount of the acid added was 0.35%.

(4) A modified propylene-ethylene random copolymer (referred to as modified PP-4 hereinafter) was prepared in the same manner as for modified PP-1 except that the crystalline propylene-ethylene block copolymer was replaced by a crystalline propylene-ethylene random copolymer (MFR=3.0 g/10 min, ethylene content=3%). The amount of the acid added was 0.42%.

Preparation of modified ethylene-α-olefin copolymer (EPC)

(1) Ethylene-propylene copolymer rubber [EP-07P, a product of Japan Synthetic Rubber Co., Ltd., ethylene content=73%, Mooney viscosity $ML_{1+4}$ (100°)=70, referred to as EPR hereinafter] was modified in the same manner as for modified PP-1 or modified PP-3 to give modified EPR-1 (amount of HA acid added=0.7%) and modified EPR-2 (amount of MA acid added=0.75%)

(2) Ethylene-propylene-ethylidenenorbornene terpolymer [V-3708, a product of Exxon Chemical Inc., ethylene content=65%, Mooney viscosity $ML_{1+4}$ (127° C.)=50, referred to as EPDM hereinafter] was modified in the same manner as for modified PP-1 or modified PP-3 to give modified EPDM (amount of HA acid added=0.8%).

Crystalline polypropylene (1) Homopolypropylene (MFR=1.0 g/10 min, referred to as PP-1 hereinafter)

(2) Homopolypropylene (MFR=15.0 g/10 min, referred to as PP-2 hereinafter)

(3) Homopolypropylene (MFR=40.0 g/10 min, referred to as PP-3 hereinafter)

(4) Propylene-ethylene block copolymer (MFR=22.0 g/10 min, ethylene content=7%, referred to as PP-4 hereinafter)

(5) Propylene-ethylene block copolymer (MFR=40.0 g/10 min, ethylene content=7%, referred to as PP-5 hereinafter)

Nylon (1) Nylon-6 (relative viscosity=2.6, A-1030BRL (a product of Unitika Ltd.), referred to as NY-1)

(2) Nylon-6 (relative viscosity=3.4, A-1030BRT (a product of Unitika Ltd.), referred to as NY-2)

(3) Nylon-66 (Malanyl A-125 (a product of Unitika Ltd.), referred to as NY-3)

Ethylene-propylene copolymer rubber (1) Ethylene-propylene copolymer rubber [a product of Japan Synthetic Rubber Co., Ltd., ethylene content=73%, Mooney viscosity $ML_{1+4}$ (100° C.)=70, referred to as EPR hereinafter].

Metal compound (1) Zinc acetate [$Zn(OAc)_2$]
(2) Sodium hydroxide (NaOH)

EXAMPLES 1 TO 20 AND COMPARATIVE EXAMPLES 1 TO 4

Preparation of Compositions (1) Sequential blending

The modified PP and metal compound in prescribed amounts were fed to a 65 mm single-screw extruder set at 230° C. for melt-mixing and pelletization. The resulting pellets, pellets of crystalline PP, nylon, and modified EPR, were dry-blended in the ratio shown in Table 1, and the resulting mixture was melt-mixed using a 40 mm twin-screw mixer at 250° C. Thus there was obtained a uniform composition.

(2) Simultaneous blending

Pellets of crystalline PP, modified PP, nylon, modified EPR, and metal compound, were dry-blended simultaneously in the ratio shown in Table 1. The resulting mixture was mixed using a twin-screw mixer at 250° C. Thus there was obtained a uniform composition.

(3) After blending

Pellets of crystalline PP, modified PP, nylon, and modified EPR, were dry-blended in the ratio shown in Table 1. The resulting mixture was mixed using a twin-screw mixer at 250° C. To the mixture was introduced the metal compound through the barrel of the twin-screw extruder at 250° C., followed by mixing. Thus there was obtained a uniform composition.

The compositions prepared by the above-mentioned methods were made into test pieces by injection molding at a molding temperature of 230° C. and a mold temperature of 50° C. The test pieces were examined for physical properties. The results are shown in Table 1.

The test methods used in the examples are as follows:
(1) MFR: JIS K7210 (load 2.16 kg, 230° C.)
(2) Tensile strength and tensile elongation at break: ASTM D638
(3) Flexural modulus: ASTM D790
(4) Izod impact strength: ASTM D256 (at 23° C., with notch)
(5) Surface gloss: ASTM D523 (60°)

TABLE 1

| Example No. | 1 | 2 | 3 | 4 | 5 | 6 |
|---|---|---|---|---|---|---|
| PP | PP-1 | PP-3 | PP-1 | PP-3 | PP-4 | PP-2 |
| (parts) | 56 | 56 | 56 | 56 | 56 | 56 |
| Modified PP | Mod PP-1 | Mod PP-2 | Mod PP-3 | Mod PP-4 | Mod PP-1 | Mod PP-1 |
| (parts) | 14 | 14 | 14 | 14 | 14 | 14 |
| Nylon | NY-1 | NY-1 | NY-1 | NY-1 | NY-1 | NY-1 |
| (parts) | 30 | 30 | 30 | 30 | 30 | 30 |
| Modified EPC | Mod EPR-1 | Mod EPR-1 | Mod EPR-1 | Mod EPR-1 | Mod EPR-1 | Mod EPR-1 |
| (parts) | 30 | 30 | 30 | 30 | 20 | 5 |
| EPC | — | — | — | — | EPR-1 | — |
| (parts) | — | — | — | — | 10 | — |
| Metal compound | $Zn(OAc)_2$ | $Zn(OAc)_2$ | $Zn(OAc)_2$ | $Zn(OAc)_2$ | $Zn(OAc)_2$ | $Zn(OAc)_2$ |
| (parts) | 0.08 | 0.08 | 0.08 | 0.08 | 0.06 | 0.03 |
| Blending method | simul. | simul. | simul. | simul. | simul. | simul. |
| Ratio to acid | equimolar | equimolar | equimolar | equimolar | equimolar | equimolar |
| Tensile strength ($kg/cm^2$) | 260 | 290 | 270 | 260 | 270 | 400 |
| Elongation at break (%) | 18.3 | 17.4 | 19.0 | 18.5 | 18.8 | 13.3 |
| Flexural modulus ($kg/cm^2$) | 10000 | 11000 | 10000 | 10000 | 12000 | 16000 |
| Izod impact strength (kg-cm/cm) | 29.2 | 28.4 | 29.1 | 28.5 | 27.3 | 22.3 |
| Surface gloss (%) | 72 | 74 | 72 | 73 | 72 | 73 |

| Example No. | 7 | 8 | 9 | 10 | 11 | 12 |
|---|---|---|---|---|---|---|
| PP | PP-2 | PP-1 | PP-1 | PP-1 | PP-1 | PP-1 |
| (parts) | 56 | 30 | 76 | 26 | 56 | 56 |
| Modified PP | Mod PP-1 | Mod PP-1 | Mod PP-1 | Mod PP-1 | Mod PP-1 | Mod PP-1 |
| (parts) | 14 | 40 | 14 | 14 | 14 | 14 |
| Nylon | NY-1 | NY-1 | NY-1 | NY-2 | NY-3 | NY-3 |
| (parts) | 30 | 30 | 10 | 60 | 30 | 30 |
| Modified EPC | Mod EPR-1 | Mod EPR-1 | Mod EPR-1 | Mod EPR-1 | Mod EPR-1 | Mod EPR-1 |
| (parts) | 10 | 30 | 30 | 10 | 30 | 5 |
| EPC | — | — | — | — | — | EPR-1 |
| (parts) | — | — | — | — | — | 25 |
| Metal compound | $Zn(OAc)_2$ | $Zn(OAc)_2$ | $Zn(OAc)_2$ | $Zn(OAc)_2$ | $Zn(OAc)_2$ | $Zn(OAc)_2$ |
| (parts) | 0.05 | 0.12 | 0.08 | 0.05 | 0.08 | 0.03 |
| Blending method | simul. | simul. | simul. | simul. | simul. | simul. |
| Ratio to acid | equimolar | equimolar | equimolar | equimolar | equimolar | equimolar |
| Tensile strength ($kg/cm^2$) | 350 | 330 | 220 | 270 | 280 | 370 |
| Elongation at break (%) | 15.1 | 14.1 | 19.0 | 18.3 | 18.4 | 23.4 |
| Flexural modulus ($kg/cm^2$) | 13000 | 12000 | 10000 | 11000 | 12000 | 12000 |
| Izod impact strength (kg-cm/cm) | 24.1 | 21.5 | 30.1 | 25.1 | 28.5 | 26.1 |
| Surface gloss (%) | 72 | 71 | 74 | 70 | 77 | 75 |

| Example No. | 13 | 14 | 15 | 16 | 17 | 18 |
|---|---|---|---|---|---|---|
| PP | PP-1 | PP-1 | PP-1 | PP-1 | PP-1 | PP-1 |
| (parts) | 63 | 56 | 56 | 56 | 56 | 56 |
| Modified PP | Mod PP-1 | Mod PP-1 | Mod PP-1 | Mod PP-1 | Mod PP-1 | Mod PP-1 |
| (parts) | 7 | 14 | 14 | 14 | 14 | 14 |
| Nylon | NY-3 | NY-3 | NY-3 | NY-3 | NY-3 | NY-3 |
| (parts) | 30 | 30 | 30 | 30 | 30 | 30 |
| Modified EPC | Mod EPR-1 | Mod EPR-1 | Mod EPR-1 | Mod EPR-1 | Mod EPR-1 | Mod EPR-1 |
| (parts) | 5 | 30 | 30 | 30 | 30 | 30 |
| EPC | — | — | — | — | — | — |
| (parts) | — | — | — | — | — | — |
| Metal compound | $Zn(OAc)_2$ | $Zn(OAc)_2$ | $Zn(OAc)_2$ | $Zn(OAc)_2$ | $Zn(OAc)_2$ | NaOH |
| (parts) | 0.02 | 0.08 | 0.08 | 0.04 | 0.4 | 0.01 |
| Blending method | simul. | seque. | after | simul. | simul. | simul. |
| Ratio to acid | equimolar | equimolar | equimolar | ¼ mol | 5 × mol | equimolar |
| Tensile strength ($kg/cm^2$) | 440 | 250 | 280 | 290 | 300 | 280 |
| Elongation at break (%) | 17.3 | 17.8 | 18.7 | 17.7 | 17.4 | 18.8 |
| Flexural modulus ($kg/cm^2$) | 13000 | 11000 | 12000 | 13000 | 12000 | 12000 |
| Izod impact strength (kg-cm/cm) | 23.1 | 28.6 | 29.0 | 26.6 | 29.4 | 28.9 |
| Surface gloss (%) | 76 | 78 | 78 | 74 | 79 | 78 |

| Example No. | 19 | 20 | 1* | 2* | 3* | 4* |
|---|---|---|---|---|---|---|
| PP | PP-1 | PP-1 | PP-1 | PP-1 | PP-1 | PP-1 |
| (parts) | 56 | 56 | 56 | 56 | 56 | 56 |
| Modified PP | Mod PP-1 | Mod PP-1 | Mod PP-1 | Mod PP-1 | Mod PP-1 | Mod PP-1 |
| (parts) | 14 | 14 | 14 | 14 | 14 | 14 |
| Nylon | NY-1 | NY-1 | NY-1 | NY-1 | NY-1 | NY-3 |
| (parts) | 30 | 30 | 30 | 30 | 30 | 30 |
| Modified EPC | Mod EPR-2 | Mod EPDM | Mod EPR-1 | — | — | Mod EPR-1 |
| (parts) | 30 | 30 | 30 | — | — | 30 |
| EPC | — | — | — | EPR-1 | EPR-1 | — |
| (parts) | — | — | — | 30 | 30 | — |
| Metal compound | $Zn(OAc)_2$ | $Zn(OAc)_2$ | — | — | $Zn(OAc)_2$ | — |
| (parts) | 0.086 | 0.091 | — | — | 0.025 | — |
| Blending method | simul. | simul. | — | — | simul. | — |
| Ratio to acid | equimolar | equimolar | — | — | equimolar | — |
| Tensile strength ($kg/cm^2$) | 280 | 270 | 240 | 300 | 320 | 270 |

TABLE 1-continued

| | | | | | | |
|---|---|---|---|---|---|---|
| Elongation at break (%) | 19.0 | 18.9 | 21.0 | 35.0 | 33.0 | 17.9 |
| Flexural modulus (kg/cm$^2$) | 10200 | 10000 | 7500 | 11000 | 10000 | 12000 |
| Izod impact strength (kg-cm/cm) | 30.2 | 29.5 | 38.1 | 9.8 | 10.1 | 29.4 |
| Surface gloss (%) | 73 | 72 | 52 | 60 | 63 | 65 |

*Comparative Examples

INDUSTRIAL USES OF THE INVENTION

The composition of the invention improves the compatibility of polyolefin and polyamide, and also in its uniformity, over the conventional composition. Therefore, it has improved surface gloss and mechanical strength, especially impact resistance. In addition, the composition of the invention is also improved in its ability to be painted and its adhesion.

Because of the above-mentioned characteristic properties, the composition of the invention is suitable for industrial materials, especially for use in automobiles and household electric appliances.

We claim:

1. A thermoplastic composition which comprises:
   (A) 1 to 98 parts by weight of a crystalline polyolefin selected from one or more of the group consisting of homopolymers of C$_3$-C$_6$ alpha olefins and copolymers of two or more C$_3$-C$_6$ alpha olefins;
   (B) 40 to 49 parts by weight of a modified polyolefin prepared by reacting a crystalline polyolefin as defined in (A) with an unsaturated carboxylic acid or derivative thereof;
   (C) 1 to 98 parts by weight of polyamide
   (D) 5 to 50 parts by weight of an ethylene-alpha-olefin copolymer having a degree of crystallinity lower than 40%, that has been modified by reacting said copolymer with an unsaturated carboxylic acid or its derivative;
   (E) 0.5–5 molar equivalents of the total of said unsaturated carboxylic and or derivative thereof reacted with said modified polyolefin of element (B) and with said copolymer element (D), of a metal compound selected from the group consisting of carboxylates, hydroxides and oxides of Group I, II and III metals and wherein said parts by weight of (A), (B) and (C) sum to 100 parts by weight.

2. The thermoplastic resin composition in accordance with claim 1 wherein said crystalline polyolefin (A) is selected from the group consisting of crystalline polypropylene or propylene copolymer.

3. The thermoplastic resin composition in accordance with claim 2 wherein said modified polyolefin (B) is prepared by reacting a crystalline polyolefin as defined in element (A) with said acid or derivative thereof.

4. The thermoplastic resin composition in accordance with claim 1 wherein said copolymer containing ethylene (D) contains 20–80 weight percent of ethylene and has a Mooney viscosity ML$_{1+8}$ (127° C.) of 5–300.

5. The thermoplastic resin composition according to claim 1 wherein said metal compound is selected from the group consisting of carboxylates, hydroxides, and oxides of zinc and sodium.

6. The composition of claim 5 wherein said metal compound is selected from zinc acetate and sodium hydroxide.

7. The composition of claim 2 wherein said copolymer (D) additionally contains a non-conjugated diene.

8. The composition in accordance with claim 2 wherein said copolymer (D) is selected from the group consisting of ethylene-propylene-copolymer rubber and ethylene propylene-ethylidene norbornene terpolymer.

9. The method for preparation of a thermoplastic resin composition comprising blending by melt-mixing the following components:
   (A) 1 to 98 parts by weight of a crystalline polyolefin selected from the group consisting of homopolymers of C$_3$-C$_6$ alpha olefins, and copolymers of two or more C$_3$-C$_6$ alpha olefins;
   (B) 1 to 49 parts by weight of a modified polyolefin prepared by reacting a crystalline polyolefin as described in (A) with an unsaturated carboxylic acid or derivative thereof;
   (C) 1 to 98 parts by weight of polyamide;
   (D) 5 to 50 parts by weight of an ethylene-alpha-olefin copolymer having a degree of crystallinity lower than 40% that has been modified by reacting said copolymer with an unsaturated carboxylic acid or derivative thereof;
   (E) 0.5–5 molar equivalents of the total of said unsaturated carboxylic acid or derivative thereof reacted with said modified polyolefin element of (B) and with said copolymer of ethylene of element (D), of metal compound selected from the group consisting of carboxylates, hydroxides and oxides of Group I, II and III metals; and wherein said parts by weight of (A), (B) and (C) sum to 100 parts by weight.

10. The process of claim 9 wherein said melt-mixing is conducted in sequential blending steps.

11. The process of claim 9 wherein said melt-mixing is conducted in a simultaneous blending step.

12. The process of claim 9 wherein said melt-mixing comprises the steps of:
    (i) melt-mixing elements (A), (B), (C) and (D);
    (ii) providing to the melt-mixing composition prepared according to step (i) the metal compound (E); and
    (iii) melt-mixing the resulting product of step (ii).

* * * * *